US012002642B2

(12) United States Patent
Jerman et al.

(10) Patent No.: US 12,002,642 B2
(45) Date of Patent: Jun. 4, 2024

(54) ELECTRIC FUSE WITH A MELTING MEMBER

(71) Applicant: ETI Elektroelement, d.o.o., Izlake (SI)

(72) Inventors: Anze Jerman, Smartno pri Litiji (SI); Jernej Pisanec, Senovo (SI); Uros Polc, Cemsenik (SI); Miha Brvar, Trbovlje (SI); Brane Lebar, Zagorje ob Savi (SI); Said Beganovic, Velenje (SI)

(73) Assignee: ETI Elektroelement, D.O.O. (SI)

( * ) Notice: Subject to any disclaimer, the term of this patent is extended or adjusted under 35 U.S.C. 154(b) by 210 days.

(21) Appl. No.: 17/777,559

(22) PCT Filed: Mar. 27, 2020

(86) PCT No.: PCT/SI2020/000005
§ 371 (c)(1),
(2) Date: May 17, 2022

(87) PCT Pub. No.: WO2021/101453
PCT Pub. Date: May 27, 2021

(65) Prior Publication Data

US 2022/0399175 A1 Dec. 15, 2022

(30) Foreign Application Priority Data

Nov. 19, 2019 (SI) ................................ P-201900232

(51) Int. Cl.
*H01H 85/042* (2006.01)
*H01H 85/157* (2006.01)

(52) U.S. Cl.
CPC ........ *H01H 85/042* (2013.01); *H01H 85/157* (2013.01)

(58) Field of Classification Search
CPC ............... H01H 85/042; H01H 85/157; H01H 85/0418; H01H 85/18; H01H 85/36
See application file for complete search history.

(56) References Cited

U.S. PATENT DOCUMENTS 3,460,086 A * 8/1969 Fister .................. H01H 85/157 337/202
4,646,053 A * 2/1987 Mosesian ............ H01H 85/157 337/252

(Continued)

FOREIGN PATENT DOCUMENTS

CH 668503 A5 * 12/1988 .......... H01H 85/157
CN 203398066 U 1/2014

(Continued)

OTHER PUBLICATIONS

Wallner Peter, "Protection fuse with protrusions from terminal caps—has ends of fusible element retained in crimped tubular protrusions under metallic covers of standard size", Dec. 30, 1988, Schurter AG, Entire Document (Translation of CH 668503) . (Year: 1988).*

(Continued)

*Primary Examiner* — Stephen S Sul
(74) *Attorney, Agent, or Firm* — Haynes and Boone, LLP; William B. Nash

(57) ABSTRACT

The present disclosure describes an electric fuse, comprising a melting member contained within an insulated cylindrical casing, which is sealed at each end by an electrically conductive cover electrically connected to said melting member. On each end of the fuse casing, between said casing and said cover, is installed an electrically conductive and plastically deformable separating barrier. On the side of separating barrier facing the interior of the casing is affixed a layer of an elastic and electrically insulating material. The melting member is on each end portion of said fuse electrically connected with each cover via said separating barrier and proceeds through said electrically insulating layer. Within said layer the melting member has at least one bend, (Continued)

by which it is anchored therein and secured against being pulled out.

3 Claims, 1 Drawing Sheet

(56) References Cited

U.S. PATENT DOCUMENTS

| | | | | |
|---|---|---|---|---|
| 10,290,457 | B1 * | 5/2019 | Lasini | H01H 85/60 |
| 11,348,754 | B2 * | 5/2022 | Kanapady | H01H 85/1755 |
| 2004/0021546 | A1 * | 2/2004 | Nakano | H01H 85/157 337/186 |
| 2004/0104801 | A1 * | 6/2004 | Jollenbeck | H01H 85/157 337/159 |
| 2005/0168315 | A1 * | 8/2005 | Brown | H01H 85/05 337/248 |
| 2007/0159291 | A1 | 7/2007 | Wilniewczyc | |
| 2008/0117015 | A1 | 5/2008 | Leach | |
| 2010/0245025 | A1 * | 9/2010 | de Leon | H01H 85/08 337/290 |
| 2012/0038451 | A1 * | 2/2012 | Voigt | B29C 48/06 337/188 |
| 2012/0068810 | A1 * | 3/2012 | Spalding | H01H 85/157 337/248 |
| 2015/0137934 | A1 | 5/2015 | Von Zur Muehlen | |

FOREIGN PATENT DOCUMENTS

| | | | | |
|---|---|---|---|---|
| CN | 204289315 U | | 4/2015 | |
| EP | 0116723 A1 | * | 8/1984 | H01H 85/157 |

OTHER PUBLICATIONS

International Search Report and Written Opinion dated Jun. 29, 2020 issued in PCT App. No. PCT/SI2020/000005.

* cited by examiner

ELECTRIC FUSE WITH A MELTING MEMBER

CROSS-REFERENCE TO RELATED APPLICATIONS

This application is a United States national phase application of co-pending International Patent Application No. PCT/SI2020/000005, which claims the benefit of Slovenia Patent Application No. P-201900232 filed 19 Nov. 2019, both of which are hereby incorporated by reference in their entirety.

BACKGROUND

The present disclosure involves electrical protective components in which electric current is flowing through a part of a meltable material and may be interrupted by melting of said material, wherein the present disclosure refers to design details of fuses.

The present disclosure addresses a design of an electric fuse, which generally may comprise a melting member, which extends throughout an electrically insulating cylindrical casing, which is on each terminal portion thereof sealed and closed by an electrically conductive cover, to which said melting member is electrically connected. Despite unchanged overall dimensions a fuse of the present disclosure could be applied in various electric circuits, and in the case of an electric overload such modified fuse would still be capable of interrupting the electric circuit extending there-through, by which potential mechanical damage or even destruction of said ceramic insulating casing would be avoided, thus preventing a generated arc from the interior of the casing towards the exterior of the fuse.

Electric fuses with melting members, are commonly used in the field of protection of electric circuits, including for example in direct current circuits in photovoltaic power plants or high-voltage systems. In some applications the voltage in an electric power circuit may reach around 1.500 V, and the electric current value around 25 A or 30 A. Suitable fuses are embedded in suitable carriers and must generally be replaceable, so the dimensions thereof must be pre-defined.

The limits on dimensions may also affect which type of fuse should be used based on nominal voltage and current. Dimensional considerations are affected by material, resistance, and squaring of cross-section, as well as the processes which cause melting of said melting member. During circuit interruption, the melting member may be heated up to the melting temperature thereof, upon which at least one section thereof becomes molten and broken. Gasses may also be generated in such processes, and the pressure within the fuse may essentially increase. In particular in direct current circuits, it is common for an electric arc to jump a gap in between both interrupted sections of the melting member. If the fuse casing is broken or even crushed by an explosion or other catastrophic event, then an electric arc may freely access the surrounding area, causing combustion or other damage. Although the interior of the casing is normally filled with fireproof granulated material, the casing may be damaged therefore adversely affecting its ability to prevent an arc.

Electrically insulating fuse casing is usually made of ceramics, which is fragile and may be damaged by increasing pressure within the fuse during an explosion. Some casings consist of a composite material or a duroplastic electrically insulating material. In a similar catastrophic event, cases of such material may suffer overheating and carbonization, at least on the inner surface of the fuse casing due to burning of said electric arc. Such carbonized surface of the material, which has been initially electrically non-conductive, may become electrically conductive, which means that, despite interruption of the melting member, the fuse may still conduct electric current.

The present disclosure refers to an electric fuse with a melting member, wherein such fuse comprises a cylindrical tubular casing, which consists of an electrically insulating material and through which a melting member consisting of an electrically conductive material having a pre-determined electric resistance and a pre-determined melting temperature is inserted. A casing is on each terminal area, and is closed or sealed by a cartridge-like cover that protrudes along the axis of the casing. The cover is closed on the terminal area and consists of an electrically conductive material and is electrically connected with said melting member, and wherein the interior of said casing is filled with a suitable quantity of granulated fireproof and electrically insulating material, by which said melting member is surrounded.

The present disclosure provides that on each terminal area of the fuse casing, namely between said casing and said cover, a separating barrier is inserted, which consists of an electrically conductive and plastically deformable material and on which on that side, which is faced towards the interior of the fuse casing, a layer consisting of an elastic and electrically insulating material is available and is connected therewith in a non-detachable manner, so that the melting member is on each terminal portion of said fuse electrically connected with each belonging electrically conducting cover via said electrically conductive separating barrier and simultaneously extends also through said electrically insulating layer of elastic material, such that in the area within said layer is furnished with at least one bendable member, by means of which it is anchored therein and secured against being pulled-out.

In one embodiment, the said elastic electrically insulating layer may consist of silicone, which is capable of withstanding increased temperature during an overload condition for some period of time, while that area on the melting member, which is located outside of said layer and within the interior of the fuse casing, is surrounded by granulated material, which may consist of silica sand.

DETAILED DESCRIPTION

An exemplary fuse design according to the present disclosure will now be described in conjunction with the included figures.

Figure 1:
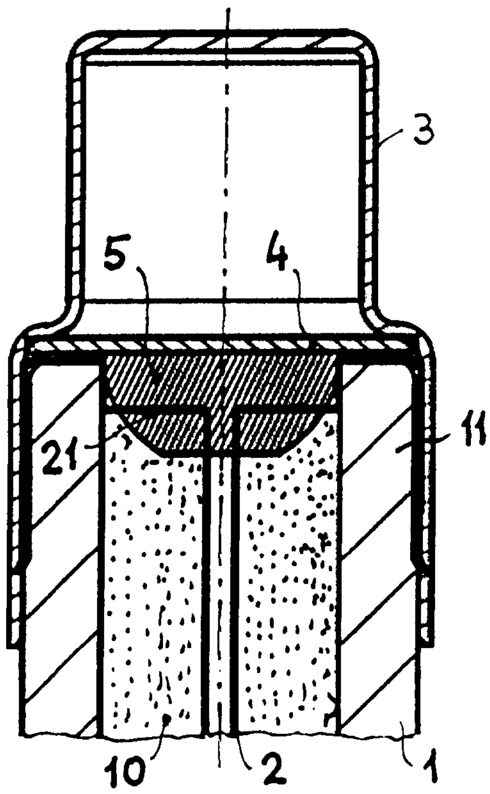
FIG. 1 shows one end of an electric fuse with a casing and a cover as a partial cross-section along its diametrical longitudinal plane during normal operations.

FIG. 1 presents one end of two or more terminal areas of an electric fuse. Said fuse may comprise a cylindrical tubular casing 1, which may comprise an electrically insulating material and through which passes a melting member 2 of an electrically conductive material having a pre-determined electric resistance and a pre-determined melting temperature. One of ordinary skill in the art would understand that the pre-determined electric resistance and melting temperature may be dictated by the design requirements of the electric circuit in which the fuse is to be installed. Although said casing 1 is just partially shown in FIGS. 1 and 2, each terminal area 11 at an end of said casing 1 is closed or sealed by a cartridge-like cover 3 that axially protrudes from and fits over the end of said case 1, which is closed on its one terminal area 11. Cover 3 may be comprised of an electrically conductive material.

Cover 3 together with the previously disclosed shape of the casing 1 may take the conventional shape and dimension together to form an overall concept of a low or high-voltage fuse, which is as such well-known to those skilled in the art and is widely used in daily practice. As a consequence, by means of said cover 3 the fuse can be integrated into various electric circuits, including disposable electric circuits.

As further shown in FIG. 1, melting member 2, which is installed in the interior of said casing 1, may be electrically connected with each of said cover 3 at terminal area 11. The interior of said casing 1 may be filled with a quantity of granulated fireproof or electrically insulating material 10, by which said melting member 2 is completely or partially surrounded. One of ordinary skill in the art would understand that the quantity or type of insulating material 10 may be dictated by the design requirements of the electric circuit in which the fuse is to be installed. In some embodiments insulating material 10 may comprise silica sand.

As further shown in FIG. 1, in some embodiments, each terminal area 11 of the fuse casing 1, namely between said casing 1 and said cover 3, a separating barrier 4 is inserted, which may comprise an electrically conductive and plastically deformable material. On the side of barrier 4 facing towards the interior of the fuse casing 1, a layer 5 is foreseen, which may comprise an elastic and electrically insulating material. One of ordinary skill in the art would understand that the quantity, shape, or type of layer 5 may be dictated by the design requirements of the electric circuit in which the fuse is to be installed. In some embodiments layer 5 may be silicone, and layer 5 may be connected in a non-detachable or fixed manner to said barrier 4.

As further shown in FIG. 1, in some embodiments, in the vicinity of the terminal area 11, melting member 2 of said fuse may be electrically connected with each cover 3 via said barrier 4 and simultaneously extends also through said electrically insulating layer 5 of elastic material. In the portion within said layer 5 the melting member 2 may be properly bent or shaped into a path 21, by which it is secured within the interior of the layer 5 and secured against being pulled out.

In FIG. 1 the fuse is presented during its regular use, when the melting member 2 is uninterrupted, so that electric current can flow between cover 3 at each end of a fuse along the melting member 2 and also through both associated separating barriers 4.

Figure 2:
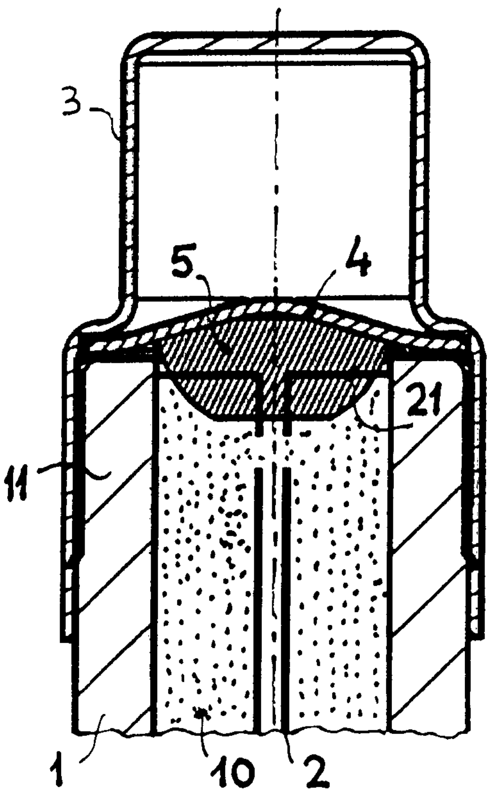
FIG. 2 is an electric fuse according to FIG. 1 after an overload condition and after interruption of the melting member, also presented as a partial cross-section along its diametrical longitudinal plane.

In the event of an electrical overload through the fuse due to excessive current through cover 3, separating barrier 4, and melting member 2, melting member 2 is heated and then overheated, so that at least one section thereof is molten, which leads to loss of electrical conductivity and interruption of the melting member 2 as shown in FIG. 2. Since the casing 1 may be closed and sealed on two or more ends of the fuse by said covers 3 and also by said separating barriers 4, increasing of temperature and generating of gasses within the fuse interior leads to increasing of pressure therein. Increasing of pressure leads to deformation or bowing of both separating barrier 4 and consequently also the layer 5, which may be firmly attached thereto. Deformation of barrier 4 may be in a direction outwardly with respect to the interior of casing 1.

As with FIG. 1, in the vicinity of the terminal area 11, FIG. 2 shows that portions of the melting member 2 includes path 21 within layer 5. During an overload condition, deformation of the separating barrier 4 together with simultaneously displacing said layer 5 may result in causing a similar deformation or distortion of path 21. Deformation of path 21 may move the parts or branches of melting member 2 oppositely apart from the other part of the melting member 2, so that the distance between both parts of the interrupted melting member 2 is increased, by which the probability of formation of an electric arc between them is reduced.

According to the present disclosure, an essential portion of thermal energy, which is associated with the electrical interruption of the melting member 2 from the overload condition, is directed toward deformation of said barrier 4 instead of generating excessive or even critical mechanical stresses in the contact area between each cover 3 and casing 1, or within the wall of the casing 1. In addition, in some embodiments the gap between both parts of path 21 of each interrupted melting member 2 is automatically extended or expanded. Such an extended gap may also me more easily filled by a granulated electrically insulating material 10, which may be present within said casing 1, which may also lead to reduction of probability of formation of an electric arc with the fuse.

Those skilled in the art will no doubt understand that such concept of a fuse, despite unchanged dimensions thereof, allows integration of the fuse into an electric circuit in which the electric loads and similar technical requirements are much higher than in a circuit in which any of the fuses known from the prior art could be applied.

While the present disclosure contains many specific implementation details, these should not be construed as limitations on the scope of any disclosure or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable sub-combination. Moreover, although features may be described herein as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings or including in the description herein may be listed in a particular order, this should not be understood as requiring that such operations be performed in the particular order shown or in sequential order, or that all operations be required to be performed, to achieve desirable results. In certain circumstances, multitasking and parallel processes may be advantageous.

Although illustrative embodiments have been shown and described, a wide range of modification, change, and substitution is contemplated in the foregoing disclosure and in some instances, some features of the embodiments may be employed without a corresponding use of other features. One of ordinary skill in the art would recognize many variations, alternatives, and modifications. Thus, the scope of any disclosure should be limited only by the following claims, and it is appropriate that the claims be construed broadly, and in a manner consistent with the exemplary embodiments disclosed herein.

What is claimed is:

1. An electric fuse comprising:

a cylindrical tubular casing comprising an electrically insulating material;

a melting member in an interior of the cylindrical tubular casing comprising an electrically conductive material;

ends of said cylindrical tubular casing, each end including a cover that extends from a corresponding end of the end of said cylindrical tubular casing, the cover comprising an electrically conductive material that is electrically connected with said melting member;

wherein the interior of said cylindrical tubular casing comprises a granulated electrically insulating material surrounding said melting member;

each end of the ends of the cylindrical tubular casing further comprising a separating barrier provided between said cylindrical tubular casing and said cover at the corresponding end of said cylindrical tubular casing comprising an electrically conductive and plastically deformable material;

a layer of elastic and electrically insulating material adjacent to the separating barrier and interior to the cylindrical tubular casing;

wherein said melting member is electrically connected to each cover via each said separating barrier; and wherein said melting member proceeds through said layer such that within said layer there is located at least one bend in the melting member, the at least one bend securing said melting member in place.

2. The electric fuse according to claim 1, wherein said layer of elastic and electrically insulating material is comprised of silicone.

3. The electric fuse according to claim 1, wherein the granulated electrically insulating material within the interior of said cylindrical tubular casing is comprised of silica sand.

* * * * *